United States Patent
Streem et al.

(10) Patent No.: US 11,355,019 B2
(45) Date of Patent: Jun. 7, 2022

(54) MOTION TRACKING INTERFACE FOR PLANNING TRAVEL PATH

(71) Applicant: AeroCine Ventures, Inc., Brooklyn, NY (US)

(72) Inventors: Brian Streem, Brooklyn, NY (US); Kenneth R. Lorell, Los Altos, CA (US); Kristoph Matthews, Brooklyn, NY (US)

(73) Assignee: AEROCINE VENTURES, INC., Brooklyn, NY (US)

( * ) Notice: Subject to any disclaimer, the term of this patent is extended or adjusted under 35 U.S.C. 154(b) by 315 days.

(21) Appl. No.: 16/549,960

(22) Filed: Aug. 23, 2019

(65) Prior Publication Data
US 2020/0066162 A1    Feb. 27, 2020

Related U.S. Application Data

(60) Provisional application No. 62/722,768, filed on Aug. 24, 2018.

(51) Int. Cl.
| | |
|---|---|
| *G08G 5/00* | (2006.01) |
| *G05D 1/00* | (2006.01) |
| *G06K 9/00* | (2022.01) |
| *B64C 39/02* | (2006.01) |
| *G06V 20/13* | (2022.01) |
| *G06V 20/64* | (2022.01) |

(52) U.S. Cl.
CPC .......... *G08G 5/003* (2013.01); *B64C 39/024* (2013.01); *G05D 1/0011* (2013.01); *G06V 20/13* (2022.01); *G06V 20/64* (2022.01); *B64C 2201/127* (2013.01)

(58) Field of Classification Search
CPC .... G08G 5/003; G08G 5/0021; G08G 5/0034; G08G 5/0069; G08G 5/0086; G08G 5/0039; G08G 5/00; G06K 9/0063; G06K 9/00201; G06K 9/00; B64C 39/024; B64C 2201/127; B64C 2201/123; B64C 2201/146; B64C 39/02; B64C 2201/141; G05D 1/0011; G05D 1/0016; G05D 3/00; G05D 1/12; G06T 7/00; G06T 7/20; G01C 21/00; G01C 21/16
See application file for complete search history.

(56) References Cited

U.S. PATENT DOCUMENTS 10,089,790 B2 * 10/2018 Lawson .............. G06K 9/00362
10,189,580 B2 *  1/2019 Lorell .................... B64C 39/024
(Continued)

*Primary Examiner* — Yonel Beaulieu
(74) *Attorney, Agent, or Firm* — Van Court & Aldridge LLP

(57) ABSTRACT

A device projects a virtual three-dimensional map of a physical environment onto an area captured by an image sensor of the device. The device receives user input to begin tracking device motion. In response to receiving the user input, the device tracks its motion within the area. The device determines location data within the area and orientation data of the image sensor within the area based on the tracked motion of the device. At least one of the location data or the orientation data is converted to real-world coordinates based on the virtual three-dimensional map of the physical environment. Path data is generated for a physical vehicle based on the at least one converted location or orientation data.

14 Claims, 8 Drawing Sheets

(56) References Cited

U.S. PATENT DOCUMENTS

| | | | |
|---|---|---|---|
| 11,048,277 B1* | 6/2021 | Zhu | G05D 1/101 |
| 2016/0047675 A1* | 2/2016 | Tanenhaus | G01C 25/005 |
| | | | 702/104 |
| 2017/0039765 A1* | 2/2017 | Zhou | G06T 7/55 |
| 2020/0066162 A1* | 2/2020 | Streem | G06K 9/00201 |
| 2020/0380178 A1* | 12/2020 | Santarone | G08B 21/0275 |
| 2021/0199460 A1* | 7/2021 | Yerli | G01C 21/367 |
| 2021/0248283 A1* | 8/2021 | Kincart | G06F 30/13 |

* cited by examiner

MOTION TRACKING INTERFACE FOR PLANNING TRAVEL PATH

CROSS-REFERENCE TO RELATED APPLICATIONS

The present application claims the benefit of U.S. Provisional Patent Application Ser. No. 62/722,768, entitled "MOTION TRACKING INTERFACE FOR PLANNING TRAVEL PATH," filed Aug. 24, 2018, which is hereby incorporated herein by reference in its entirety and made part of the present U.S. Utility Patent Application for all purposes.

TECHNICAL FIELD

The present description generally relates to planning a travel path for a vehicle (e.g., an aircraft vehicle), including use of a motion tracking interface for planning a travel path.

BACKGROUND

Aircraft vehicles such as drones may be controlled using a two stick controller that may be difficult for a pilot operator. In addition to controlling the flight path, the pilot operator (or a separate operator) may control orientation and operation of a camera coupled to the drone. This may make it even more difficult to effectively control the drone and its camera.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Figure 1:
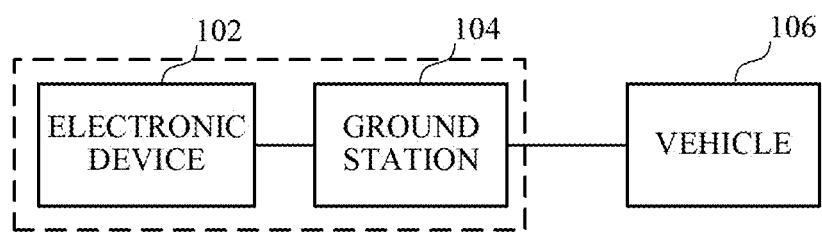
FIG. 1 is a block diagram illustrating an embodiment of a system for generating path data for a vehicle.

FIG. 1 is a block diagram illustrating an embodiment of a system for generating path data for a vehicle. An electronic device 102 may be utilized by a user to plan a travel path (e.g., a flight path) and control a camera for a vehicle 106 (e.g., an aircraft vehicle such as a drone). Electronic device 102 may be utilized to navigate and indicate a route path within a three-dimensional virtual map of a physical environment where the vehicle is to travel and/or be operated. Examples of the electronic device 102 include, but are not limited to, a mobile device, a headset, a tablet computer, a laptop computer, a spatial tracking system, a controller, a virtual reality device, an augmented reality device, or any other device that can be utilized to receive input from a user to interact within a virtual environment model to generate path data for the vehicle. The electronic device 102 may include a localization system to determine a device location/orientation. For example, the electronic device 102 includes one or more of the following types of localization systems: motion capture system, GPS, Real Time Kinematic (RTK GPS), electromagnetic tracking system, inertial, ultra-sonic system, ultra-wideband locating system, visual marker/marker-less tracking, visual odometry, GPS-Inertial Odometry, Visual-Inertial Odometry, Lidar system, iBeacon/Tag, Simultaneous localization and mapping and Wifi Localization.

Once execution plans for a travel path are specified using the electronic device 102, specifications of the plan may be provided to a ground station 104. The ground station 104 may correspond to a system (e.g., mobile device, a tablet computer, a laptop computer) that is capable of providing data of the specification to the vehicle 106. In one or more implementations, the electronic device 102 and the ground station 104 may correspond to the same device.

The vehicle 106 receives specification of the execution plan from the ground station 104 to execute the plan. The vehicle 106 may include an onboard device with a memory and a processor that coordinate and automatically execute the specification of the plan. The specification of the plan may be provided to the vehicle 106 wired and/or wirelessly (e.g., via Bluetooth, NFC, Zigbee interface, WLAN, USB or generally any communication interface). The vehicle 106 may further include a travel path controller configured to control motor(s) of the vehicle to travel (e.g., fly) and navigate the vehicle 106. The travel path controller may utilize information from one or more sensors such as a gyroscope, a Global Positioning System, accelerometer, motion capture system, GPS, Real Time Kinematic (RTK GPS), electromagnetic tracking system, inertial, ultra-sonic system, ultra-wideband locating system, visual marker/marker-less tracking, visual odometry, GPS-Inertial Odometry, Visual-Inertial Odometry, Lidar system, iBeacon/Tag, Simultaneous localization and mapping and Wifi Localization, etc., to assist in stabilizing, orienting, and navigating the vehicle. The onboard device may provide instructions to the travel path controller to execute the received plan.

In some embodiments, commands are received from a controller (e.g., a two stick controller) while the vehicle 106 is executing the plan and one or more properties of the plan may be dynamically adjusted based on the commands from the controller. For example, using the controller, a user may provide commands to speed up or slow down a speed (e.g., flight speed) for the vehicle 106 following a trajectory path specified by the plan.

The vehicle 106 may include a payload device and configuration, and use of the payload device may have been configured using the electronic device 102 in association with the received plan. For example, the received plan may specify a vector of configuration states for the vehicle and its payload for predefined time period(s) during the planned execution time. The payload device may include one or more of the following: a camera, a gimbal, a light source, a sensor, and/or any other device able to be attached to vehicle 106.

Examples of the vehicle 106 include, but are not limited to, an Unmanned Aerial Vehicle, an airplane, a helicopter or a multirotor drone. Alternatively, the vehicle 106 may correspond to a terrain vehicle, an aquatic vehicle, a hover vehicle, an autonomous vehicle, or any other machine that can be programmed to move within an environment can be planned using a virtual environment model accessed using the electronic device 102. Although a single vehicle is shown in FIG. 1, travel paths/operation of multiple vehicles may be planned using electronic device 102. For example, a coordinated travel path for a plurality of vehicles may be planned using the virtual environment model accessed using the electronic device 102 as described herein.

Figure 2:
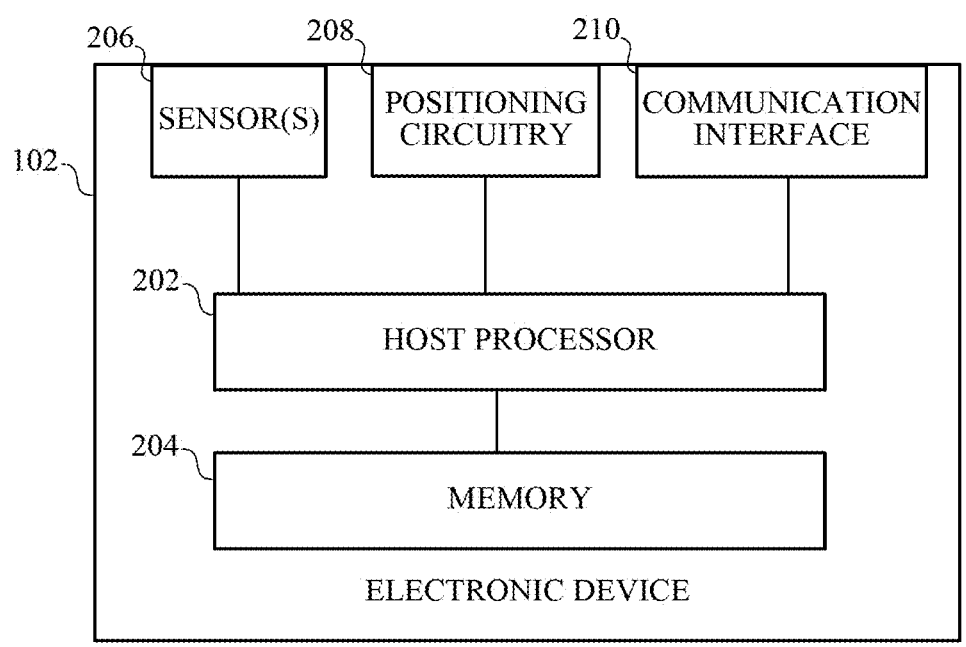
FIG. 2 illustrates an example electronic device that may implement the subject system in accordance with one or more implementations.

FIG. 2 illustrates an example electronic device that may implement the subject system in accordance with one or more implementations. For explanatory purposes, FIG. 2 is primarily described herein with reference to the electronic device 102 of FIG. 1, but may also apply to one or more of the devices 104 and 106 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, one or more sensor(s) 206, positioning circuitry 208 and a communication interface 210. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The sensor(s) 206 may include one or more motion sensor(s), such as an accelerometer and/or a rate gyroscope. The motion sensor(s) may be used to facilitate movement and orientation related functions of the electronic device 102, for example, to detect movement, direction, and orientation of the electronic device 102.

Alternatively or in addition, the sensor(s) 206 may further include one or more image sensor(s) for capturing video image data and/or still image data. For example, the sensor (s) 206 may include a rear-facing camera and/or a front-facing camera.

The positioning circuitry 208 may be used in determining the location of the electronic device 102 based on positioning technology. For example, the positioning circuitry 208 may provide for one or more of GNSS positioning (e.g., via a GNSS receiver configured to receive signals from the GNSS satellites 106a-106d), wireless access point positioning (e.g., via a wireless network receiver configured to receive signals from the wireless access points 108a-108b), cellular phone signal positioning, Bluetooth signal positioning (e.g., via a Bluetooth receiver), image recognition positioning (e.g., via an image sensor), and/or an INS (e.g., via motion sensors such as an accelerometer and/or gyroscope). As noted above with respect to FIG. 1, the sensor(s) 206 may correspond to or otherwise be part of a localization system (e.g., motion capture system, GPS, Real Time Kinematic (RTK GPS), electromagnetic tracking system, inertial, ultrasonic system, ultra-wideband locating system, visual marker/marker-less tracking, visual odometry, GPS-Inertial Odometry, Visual-Inertial Odometry, Lidar system, iBeacon/Tag, Simultaneous localization and mapping and Wifi Localization).

The communication interface 210 may include suitable logic, circuitry, and/or code that enables wired or wireless communication, such as between the electronic devices 102-104. The communication interface 210 may include, for example, one or more of a Bluetooth communication interface, an NFC interface, a Zigbee communication interface, a WLAN communication interface, a USB communication interface, or generally any communication interface.

In one or more implementations, one or more of the host processor 202, the memory 204, the sensor(s) 206, the positioning circuitry 208, the communication interface 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
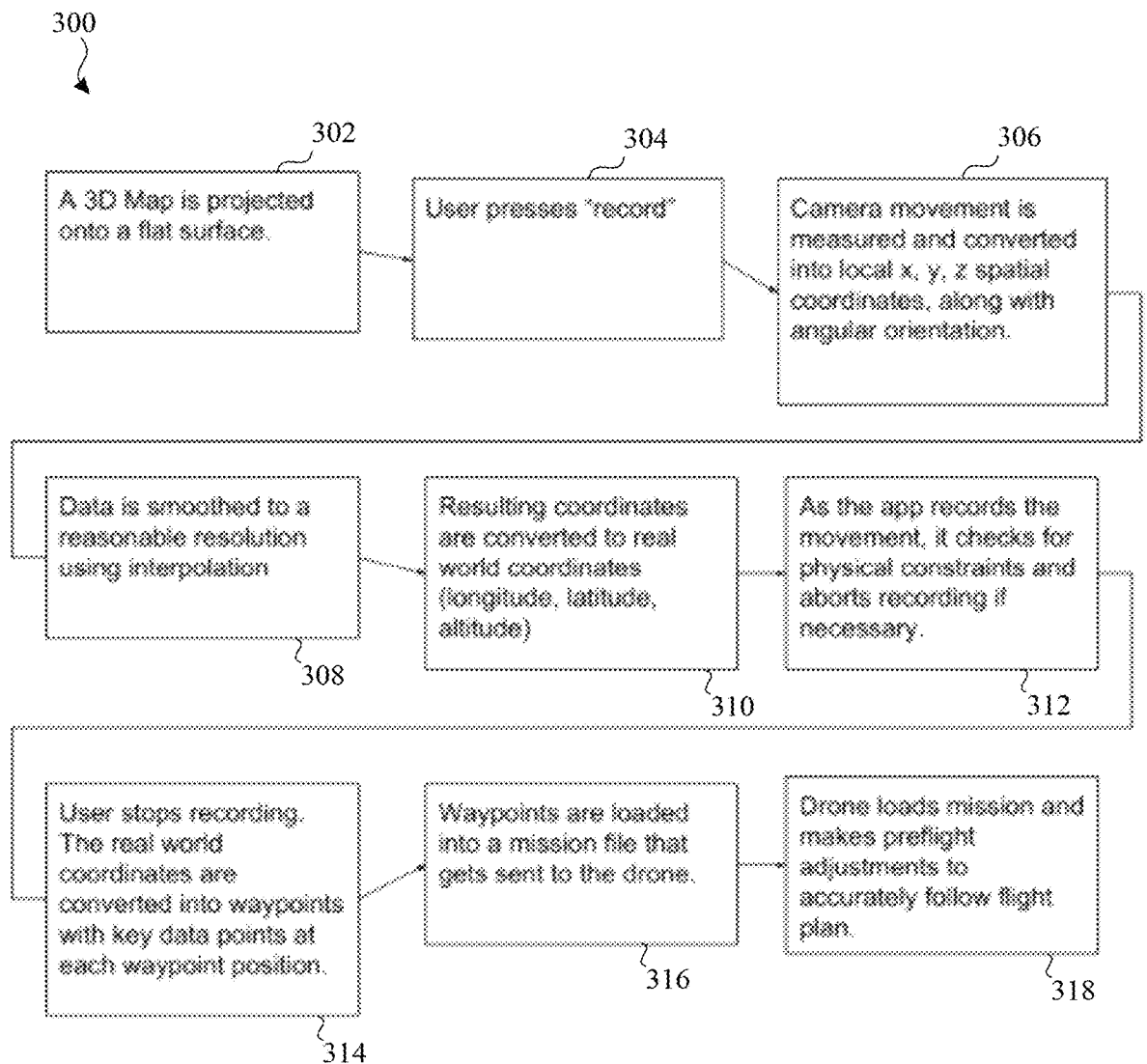
FIG. 3 illustrates a flow diagram of an example process for generating path data for a vehicle in accordance with one or more implementations.

FIG. 3 illustrates a flow diagram of an example process 300 for generating path data for a vehicle in accordance with one or more implementations. For explanatory purposes, the process 300 is primarily described herein with reference to the electronic device 102 of FIGS. 1-2. However, the process 300 is not limited to the electronic device 102, and one or more blocks (or operations) of the process 300 may be performed by one or more other components of the electronic device 102. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

Figure 4:
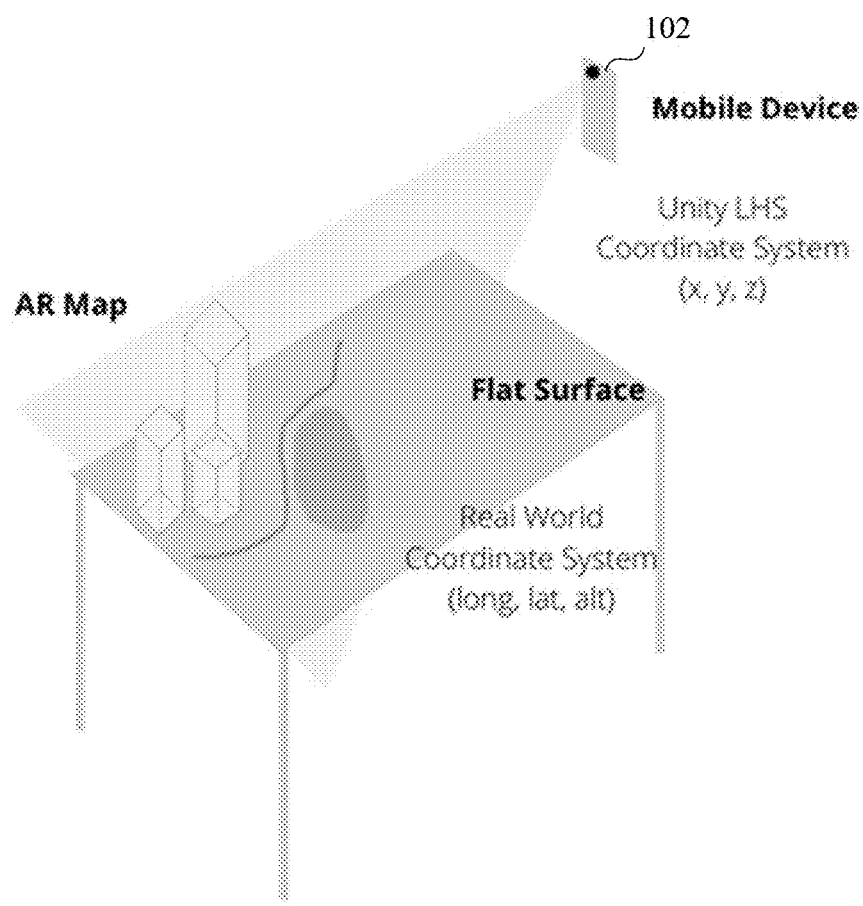
FIG. 4 illustrates an example of projecting a three-dimensional map of a physical environment onto a flat surface in accordance with one or more implementations.

A 3D Map is projected onto an area such as a flat surface (302). Using augmented reality software, a slice of a 3D map pertaining to the region of interest to a user is "projected" onto a flat surface in the user's real space, such as a table or floor. FIG. 4 illustrates an example of projecting a three-dimensional map of a physical environment onto flat surface in accordance with one or more implementations. Projecting in this context refers to the act of being able to view the real space (in this case a table) through the user's camera, but with the modification of seeing the map slice in the user's real space. This AR technology is facilitated by open source libraries (e.g., 3rd party libraries). The mapping layer rendered in the 3D environment may be provided from a public or proprietary source.

With reference to FIG. 3, the user presses "record" on the electronic device 102 (304). The user indicates that he/she would like to begin planning the vehicle path (e.g., drone flight) and camera path by pressing a record button.

Device orientation and/or camera movement (e.g., corresponding to sensor(s) 206 of the electronic device 102) is measured and converted to local coordinates (306). As the user moves the mobile device (e.g., the electronic device 102), the back camera registers movement of the mobile device relative to its environment. For example, the starting position at the time that AR is initialized in step 304, is (x:0, y:0, z:0). As the camera registers the device's movement at a sampling rate of several times per second, it records the coordinates in a local coordinate system against time.

Data is smoothed using interpolation (308). Because the sampling rate often results in too many coordinates being generated, the data is "smoothed" by selecting data at much lower time intervals.

Thus, an internal coordinate system is converted to real world coordinates (310). As noted above, the coordinates are relative to the mobile device at this point, and does not yet reflect real world coordinates that the drone would understand. Thus, the coordinates are converted into longitude, latitude, and altitude, along with camera angle data relative to the drone. Because the AR engine knows how far away the map is specified to be from the mobile device camera (as viewed by the user through the camera), the subject system has a reference to convert local coordinates into real world coordinates, and through that logic performs the above calculation.

The subject system checks for physical constraints (312). The subject system checks to ensure that the instructions sent to the drone obey the physical capabilities and constraints of the drone and its camera. Examples of capabilities and/or constraints include, but are not limited to: max lateral speed, max vertical speed, and gimbal pitch (the angle of the camera's pitch, i.e. facing the ground to facing above the horizon. Any time one of these quantities is exceeded due to the user's movement, the subject system may "rail" it at the physical limit.

Figure 5:
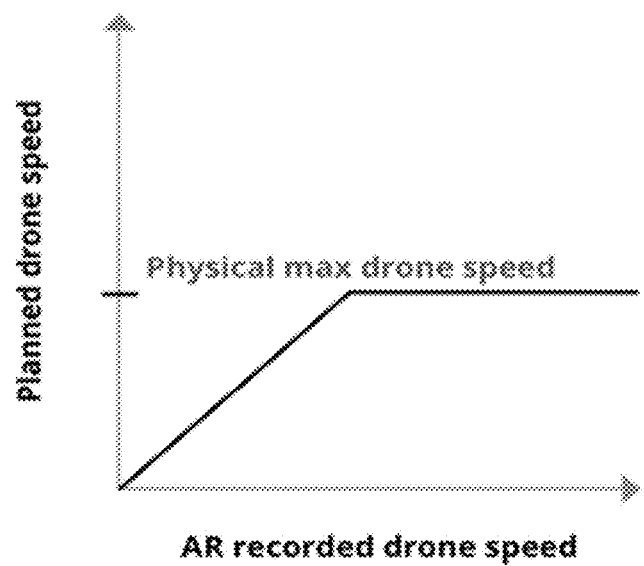
FIG. 5 illustrates a graph of an example constraint corresponding to physical capabilities of a vehicle in accordance with one or more implementations.

In this regard, FIG. 5 illustrates a graph of an example constraint corresponding to physical capabilities of a vehicle in accordance with one or more implementations. For example, if the subject system registered that within a 1 second time frame of recording time (not actual flight time), the camera has covered a distance of 500 lateral meters (as measured in the latitude/latitude real world coordinate system which was obtained in Step 5), that would represent a speed of 500 m/s, which exceeds the drone's physical speed limit. Thus, the subject system may rail the speed at 15 m/s (the lateral speed limit of the drone).

The subject system may determine not to rail some constraints, as such constraints may result in an undesirable experience for the user. In this case, the recording is aborted. For example, if a user tipped the mobile device up during tracking, in an effort to tilt the camera high above the horizon, this may not be allowed on the actual drone and would stop the recording.

The user stops recording and waypoints are generated (314). When the user either reaches a time limit of recording or presses the "stop" button, recording ceases. The subject system then proceeds to generate "waypoints" to send to the drone.

Waypoints are key points in the real world that the drone flies to, and collectively, they comprise a "Mission". Waypoints, besides indicating a position in real space (longitude, latitude, and altitude) contain key data about how the drone should behave as it approaches and goes through each waypoint. Waypoints have a data structure that the drone understands and can utilize in its navigation.

Figure 6:
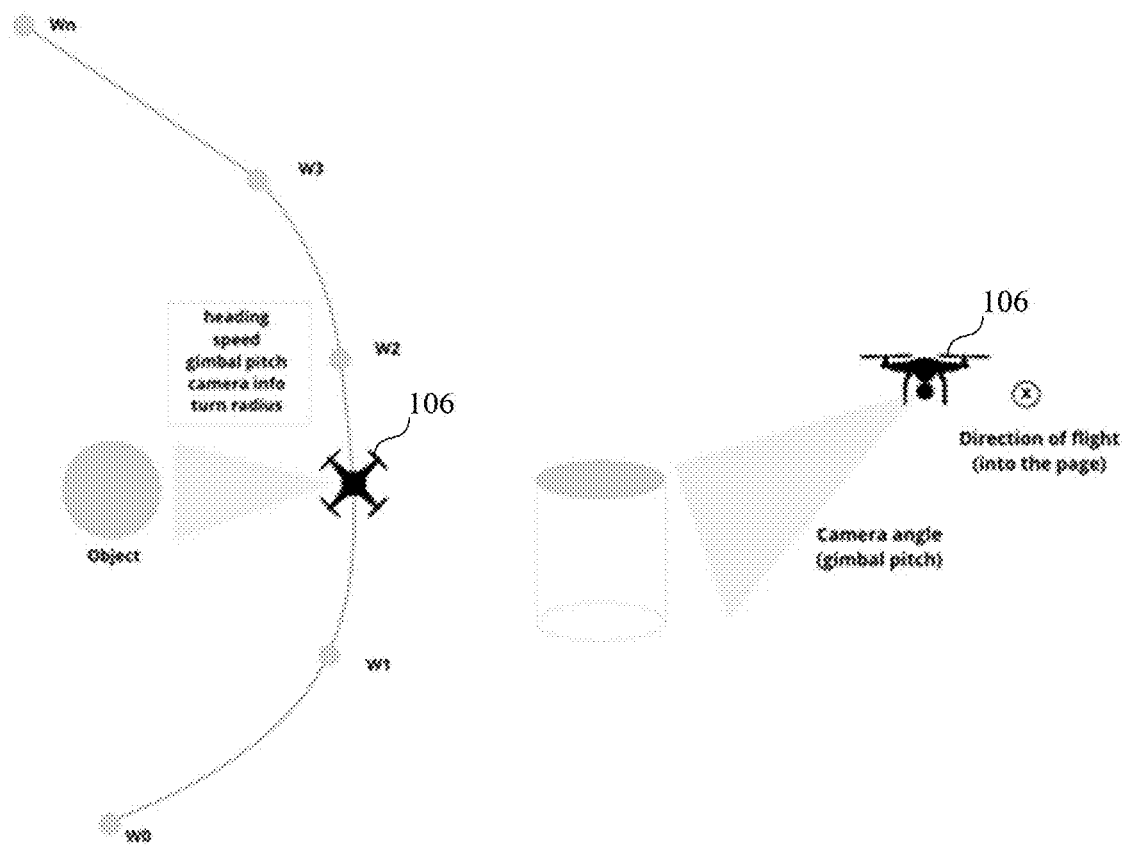
FIG. 6 illustrates an example of waypoints corresponding to path data for a vehicle in accordance with one or more implementations.

FIG. 6 illustrates example of waypoints corresponding to path data for a vehicle in accordance with one or more implementations. In the example of FIG. 6, an aerial view of waypoints is illustrated, as well as a cross sectional view as the drone traverses through a waypoint.

For example, a drone may be capable of loading up to 99 waypoints for a single mission. During the recording process, the subject system assigns a resolution of X seconds of recording time per waypoint. For example, a subject system with a waypoint resolution of 2 seconds of recording time per waypoint can record a maximum of 198 seconds of recorded footage (99 waypoints times 2 seconds per waypoint). Depending on the intricacy of the movement within that period and environmental factors, the actual flight time may vary.

Given that the subject system has converted the incoming data into real world coordinates (latitude, latitude, alt, camera angles) as a function of time, the following values may be set for each waypoint:

| | |
|---|---|
| Coordinate | Longitude, latitude |
| Altitude | Meters above mean sea level (MSL) |
| Speed | A scalar quantity of the magnitude of speed in all directions (lateral, vertical) |
| Heading | The orientation of the "nose" of the drone relative to true north. The nose does not always need to be in the direction of flight. For example, a drone can be flying sideways along a path. |
| Gimbal pitch | The angle of the camera relative to the horizon |
| Camera settings and actions | Instructions for the camera at each waypoint. For example, whether to take a photo, and camera parameters such as exposure, white balance, aperture, etc. |

While the waypoints represent discrete points, the software on the drone may provide for moving smoothly and continuously through the waypoints, such that the software calculates an appropriate turning radius unless otherwise specified.

The waypoints are loaded into a mission file (316). For example, waypoints may be packaged together into a "Mission" for a drone to understand and process a flight plan. Thus, the waypoints are collected together into a mission, which includes such parameters as mission name, starting location, and the like.

The drone loads the mission and makes preflight adjustments to accurately follow the flight plan (318). The subject system may still apply some checks and data conversions for the drone to be ready for flight. One example is converting the mean sea level altitude (MSL) into an above ground level (AGL) altitude by subtracting the current elevation of the drone at time of takeoff. This is because the drone may only work with AGL altitudes. Other routines include, but are not limited to, checking battery levels, and other conditions that determine flight worthiness.

Figure 7:
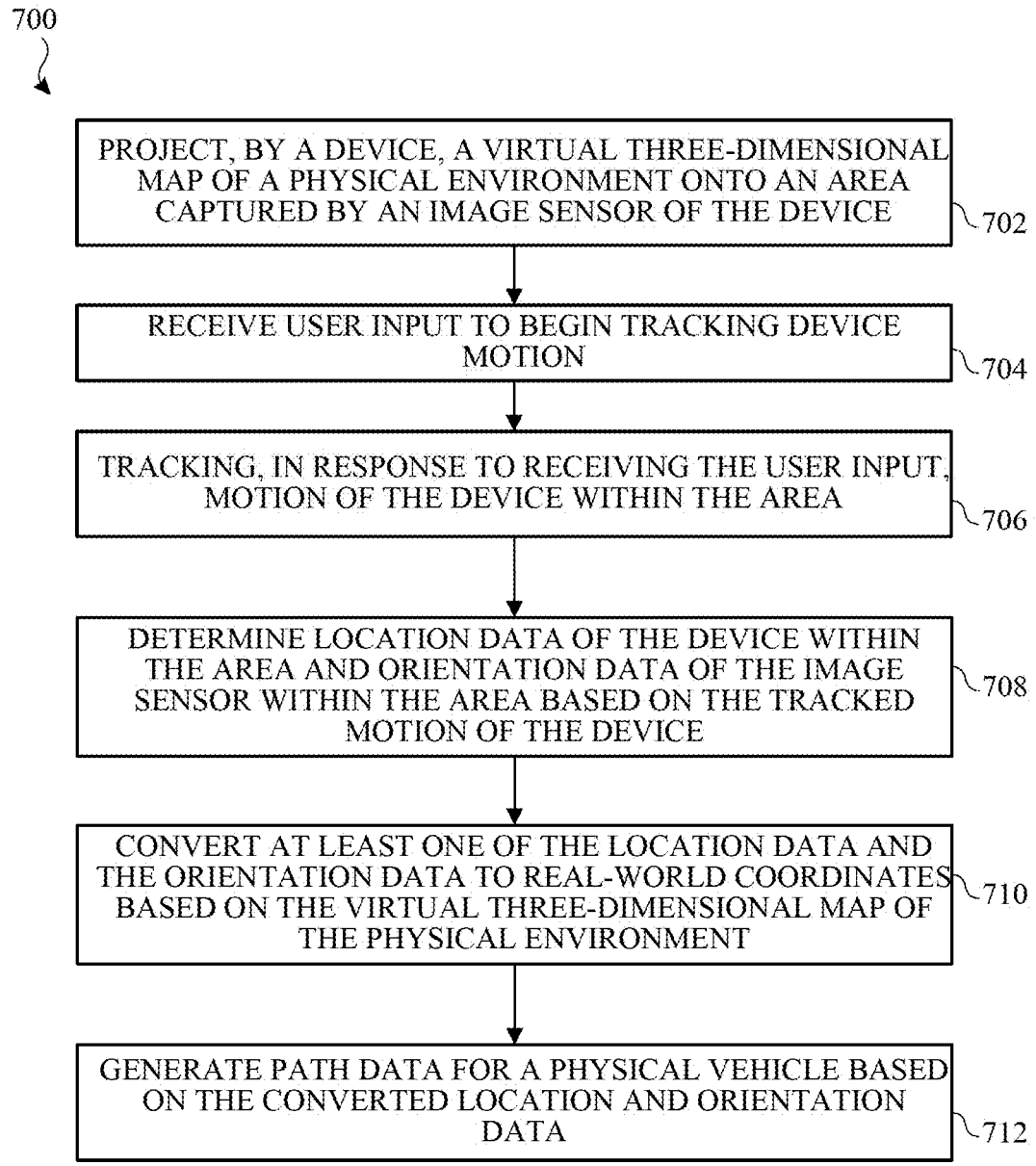
FIG. 7 illustrates a flow diagram of another example process for generating path data for a vehicle in accordance with one or more implementations.

FIG. 7 illustrates a flow diagram of another example process for generating path data for a vehicle in accordance with one or more implementations. For explanatory purposes, the process 700 is primarily described herein with reference to the electronic device 102 of FIGS. 1-2. However, the process 700 is not limited to the electronic device 102, and one or more blocks (or operations) of the process 700 may be performed by one or more other components of the electronic device 102. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 projects a virtual three-dimensional map of a physical environment onto an area captured by an image sensor of the device (702). The electronic device 102 receives user input to begin tracking device motion (704).

The electronic device 102 tracks, in response to receiving the user input, motion of the device within the area (706). The electronic device 102 determines its location within the area and orientation data of the image sensor within the area based on the tracked motion of the device (708).

The location data and the orientation data may be sampled based on a predefined sampling rate. At least one of the location data or the orientation data may be smoothed based on interpolation and/or a predefined sampling rate.

A duration of the tracking may be based on second user input to stop tracking the path. Alternatively or in addition, a duration of the tracking may be based on a predefined time limit.

The electronic device 102 converts at least one of the location data and the orientation data to real-world coordinates based on the virtual three-dimensional map of the physical environment (710). The converting may include applying constraints for the real-world coordinates, based on capabilities of the physical vehicle. The electronic device 102 generates path data for a physical vehicle based on the converted location and orientation data (712).

Figure 8:
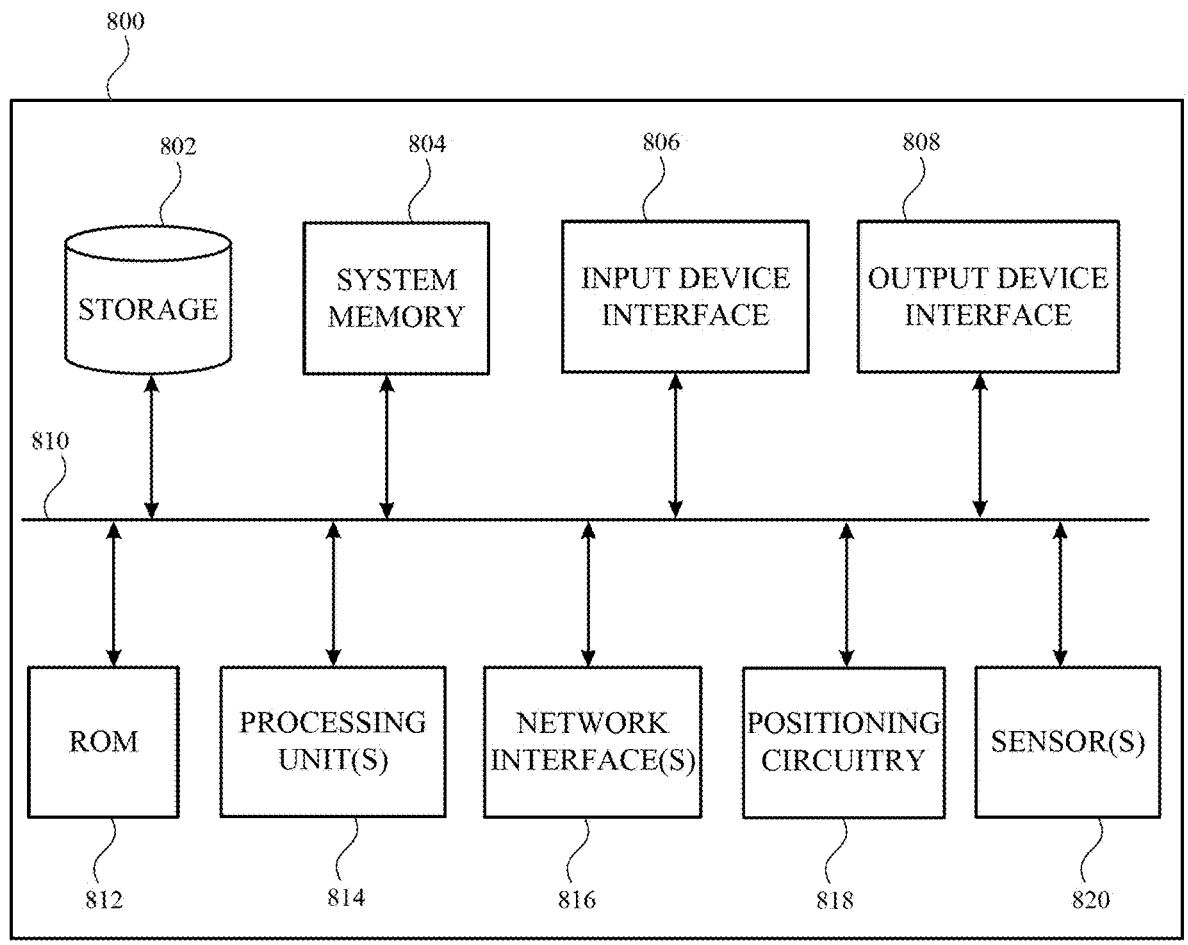
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, any of the devices 102-104 for generating the features and processes described herein. The electronic system 800 may include various types of computer readable media and interfaces for various other types of computer readable media. The electronic system 800 includes one or more processing unit(s) 814, a permanent storage device 802, a system memory 804 (and/or buffer), an input device interface 806, an output device interface 808, a bus 810, a ROM 812, one or more processing unit(s) 814, one or more network interface(s) 816, positioning circuitry 818, sensor(s) 820, and/or subsets and variations thereof.

The bus 810 collectively represents all system, peripheral, and chipset buses that communicatively connect the numerous internal devices of the electronic system 800. In one or more implementations, the bus 810 communicatively connects the one or more processing unit(s) 814 with the ROM 812, the system memory 804, and the permanent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 814 may need at runtime. In one or more implementations, the processes of the subject disclosure are stored in the system memory 804, the permanent storage device 802, and/or the ROM 812. From these various memory units, the one or more processing unit(s) 814 retrieves instructions to execute and data to process in order to execute the processes of one or more implementations.

The bus 810 also connects to the input and output device interfaces 806 and 808. The input device interface 806 enables a user to communicate information and select commands to the electronic system 800. Input devices that may be used with the input device interface 806 may include, for example, alphanumeric keyboards and pointing devices (also called "cursor control devices"). The output device interface 808 may enable, for example, the display of images generated by electronic system 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 810 also connects to positioning circuitry 818 and sensor(s) 820. The positioning circuitry 818 may be used in determining device location based on positioning technology. For example, the positioning circuitry 818 may provide for one or more of GNSS positioning, wireless access point positioning, cellular phone signal positioning, Bluetooth signal positioning, image recognition positioning, an INS (e.g., via motion sensors such as an accelerometer and/or gyroscope), and/or localization system(s).

In one or more implementations, the sensor(s) 820 may be utilized to detect movement, travel and orientation of the electronic system 800. For example, the sensor(s) may include an accelerometer, a rate gyroscope, and/or other motion-based sensor(s). Alternatively or in addition, the sensor(s) 820 may include one or more audio sensors(s) and/or image-based sensor(s) for determining device position. In another example, the sensor(s) 820 may include a barometer which may be utilized to detect atmospheric pressure (e.g., corresponding to device altitude). In another example, the sensor(s) 820 may include image sensor(s).

Finally, as shown in FIG. 8, the bus 810 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
projecting, by a device, a virtual three-dimensional map of a physical environment onto an area captured by an image sensor of the device;
receiving user input to begin tracking device motion;
tracking, in response to receiving the user input, motion of the device within the area;
determining location data of the device within the area and orientation data of the image sensor within the area based on the tracked motion of the device;
converting at least one of the location data or the orientation data to real-world coordinates based on the virtual three-dimensional map of the physical environment; and
generating path data for a physical vehicle based on the at least one converted location or orientation data, wherein a duration of the tracking is based on second user input to stop tracking the motion of the device.

2. The method of claim 1, wherein the location data and the orientation data are sampled based on a predefined sampling rate.

3. The method of claim 1, wherein at least one of the location data or the orientation data is smoothed based on at least one of interpolation or a predefined sampling rate.

4. The method of claim 1, wherein the converting comprises applying constraints for the real-world coordinates, based on capabilities of the physical vehicle.

5. The method of claim 1, wherein the area is displayed on a display of the device with respect to tracking the motion of the device, and the virtual three-dimensional map is projected on the area as displayed on the device.

6. A device, comprising:
at least one processor; and
a memory including instructions that, when executed by the at least one processor, cause the at least one processor to:
project, by the device, a virtual three-dimensional map of a physical environment onto an area captured by an image sensor of the device;
receive user input to begin tracking device motion;
track, in response to receiving the user input, motion of the device within the area;
determine location data of the device within the area and orientation data of the image sensor within the area based on the tracked motion of the device;
convert at least one of the location data or the orientation data to real-world coordinates based on the virtual three-dimensional map of the physical environment; and
generate path data for a physical vehicle based on the at least one converted location or orientation data, wherein a duration of the tracking is based on second user input to stop tracking the motion of the device.

7. The device of claim 6, wherein the location data and the orientation data are sampled based on a predefined sampling rate.

8. The device of claim 6, wherein at least one of the location data or the orientation data is smoothed based on at least one of interpolation or a predefined sampling rate.

9. The device of claim 6, wherein the converting comprises applying constraints for the real-world coordinates, based on capabilities of the physical vehicle.

10. The device of claim 6, wherein the area is displayed on a display of the device with respect to tracking the motion of the device, and the virtual three-dimensional map is projected on the area as displayed on the device.

11. A computer program product comprising code, stored in a non-transitory computer-readable storage medium, the code comprising:
code to project, by a device, a virtual three-dimensional map of a physical environment onto an area captured by an image sensor of the device;
code to receive user input to begin tracking device motion;
code to track, in response to receiving the user input, motion of the device within the area;
code to determine location data of the device within the area and orientation data of the image sensor within the area based on the tracked motion of the device;
code to convert at least one of the location data or the orientation data to real-world coordinates based on the virtual three-dimensional map of the physical environment; and
generate path data for a physical vehicle based on the at least one converted location or orientation data, wherein a duration of the tracking is based on second user input to stop tracking the motion of the device.

12. The computer program product of claim 11, wherein the location data and the orientation data are sampled based on a predefined sampling rate.

13. The computer program product of claim 11, wherein at least one of the location data or the orientation data is smoothed based on at least one of interpolation or a predefined sampling rate.

14. The computer program product of claim 11, wherein the converting comprises applying constraints for the real-world coordinates, based on capabilities of the physical vehicle.

\* \* \* \* \*